United States Patent [19]

Nelson

[11] Patent Number: 5,397,148

[45] Date of Patent: Mar. 14, 1995

[54] CONVERTIBLE TRAILER ASSEMBLY

[76] Inventor: Gary G. Nelson, P.O. Box 30, Rockton, Ill. 61072

[21] Appl. No.: 144,356

[22] Filed: Nov. 1, 1993

[51] Int. Cl.$^6$ .............................................. B62D 63/06
[52] U.S. Cl. .............................. 280/416.1; 280/456.1; 280/656
[58] Field of Search ............... 280/415.1, 416.1, 456.1, 280/460.1, 478.1, 63, 64, 638, 656, 789

[56] References Cited

U.S. PATENT DOCUMENTS

| | | | |
|---|---|---|---|
| 2,475,174 | 7/1949 | Boone | 280/63 |
| 3,033,593 | 5/1962 | Zaha | 280/460.1 |
| 4,230,340 | 10/1980 | Wasservogel | 280/656 |
| 4,645,230 | 2/1987 | Hammons | 280/460.1 |

FOREIGN PATENT DOCUMENTS 1335641   7/1963   France ............... 280/460.1

Primary Examiner—Karin L. Tyson
Assistant Examiner—Victor E. Johnson

[57] ABSTRACT

A convertible trailer assembly having a first orientation wherein a center trailer hitch is connected to a lead vehicle and a second orientation wherein two outside trailer hitches are connected to a lead vehicle. The convertible trailer assembly comprises a trailer frame having two longitudinally extending hollow side channels. A wheel assembly includes a fixed upper plate and a rotatably connected lower plate. The lower plate includes a depending skirt including a centrally located aperture, a coil overshock coupled with the lower plate, a vertical arm extending downwardly from the lower plate, horizontally extending arms connecting the lower ends of the coil overshock with the vertical arm. A wheel is rotatably mounted between the coil overshock and the horizontally extending arm with the wheel assembly being coupled to the lower surface and rearward end of the trailer frame. Side trailer hitches are provided, each having a forward end adapted to be coupled with a lead vehicle, and a rearward end adapted to be received within one of the hollow side channels. Lastly, a center trailer hitch has a forward end adapted to be coupled with a lead vehicle, and a rearward end adapted to be received within the hollow center channel.

3 Claims, 3 Drawing Sheets

CONVERTIBLE TRAILER ASSEMBLY

BACKGROUND OF THE INVENTION

1. Field of the Invention

The present invention relates to a convertible trailer assembly and more particularly pertains to a convertible trailer assembly having two different hitching arrangements.

2. Description of the Prior Art

The use of trailers is known in the prior art. More specifically, trailers designed for use behind vehicles are known to consist basically of familiar expected and obvious structural configurations, not withstanding the myriad of designs encompassed by the crowded art which have been developed for the fulfillment of countless objectives and requirements.

For example, U.S. Pat. No. 4,511,155 to Galloway discloses a trailer for a two wheeled vehicle. The trailer includes a first and a second arm designed for attachment to a vehicle.

U.S. Pat. No. 5,171,034 to Scott discloses a trailer attachment for a two-wheeled vehicle. The trailer has a single pivoting training wheel.

U.S. Pat. No. 4,883,280 discloses a hitch and suspension for one-wheel cycle trailers.

U.S. Pat. No. 5,098,113 to Albitre discloses a lightweight trailer for towing behind a bicycle. The forward end of the trailer includes a hitch assembly for coupling the forward end of an upstanding seat supporting shank of an associated bicycle.

U.S. Pat. No. 4,342,467 to Koster discloses a device which is securable to a vehicle with a single rear wheel. The device comprises a cart and includes an attachment device for securing the cart to the vehicle.

Lastly, U.S. Pat. No. 3,860,252 to Martens discloses a lower center of gravity trailer. The trailer is adapted to carry extremely heavy loads.

While these trailers fulfill their respective, particular objectives and requirements, the aforementioned patents do not describe a trailer which enables an operator to selectively employ one of two hitching arrangements. Furthermore, the aforementioned patents do not describe a trailer which has wheels that can operate in one of two modes, depending upon the hitching arrangement employed.

In this respect, the convertible trailer according to the present invention substantially departs from the conventional concepts and designs of the prior art, and in so doing provides an apparatus primarily developed for enabling the operator to use a trailer in one of two hitching modes.

Therefore, it can be appreciated that there exists a continuing need for new and improved convertible trailer assembly which can be employed in either of two configurations and in either of two modes.

SUMMARY OF THE INVENTION

In view of the foregoing disadvantages inherent in the known types of trailers now present in the prior art, the present invention provides an improved convertible trailer assembly. As such, the general purpose of the present invention, which will be described subsequently in greater detail, is to provide a new and improved convertible trailer assembly apparatus and method which has all the advantages of the prior art and none of the disadvantages.

To attain this, the present invention essentially comprises a new and improved convertible trailer assembly having a first orientation wherein a center trailer hitch is connected to a lead vehicle and the rear wheel assemblies of the trailer are prevented from rotation, and a second orientation wherein two outside trailer hitches are connected to a lead vehicle and the rear wheel assemblies are free to rotate, the convertible trailer assembly comprising, in combination, a trailer frame having an upper surface, a lower surface, a forward and rearward end, two longitudinally extending hollow side channels, each hollow side channel having a forward end and a rearward end, an aperture formed through each hollow side channel at its forward end, a longitudinally extending hollow center channel, the hollow center channel having a forward end and a rearward end and an aperture formed through its forward end. Two wheel assemblies are provided, each wheel assembly including fixed upper plate and a rotatably connected lower plate, the upper and lower plates each having a forward end and a rearward end, the lower plate including a depending skirt integral with its rearward end, the depending skirt including a centrally located aperture, two coil overshocks each having an upper end coupled with the rearward end of the lower plate and a lower end opposite the upper end, a vertical arm extending downwardly from the forward end of the lower plate, two horizontally extending arms, the two horizontally extending arms connecting the lower ends of the coil overshocks with the vertical arm, a wheel rotatably mounted between the lower ends of the two coil overshocks and the two horizontally extending arms, the upper plates of the wheel assemblies being coupled to the lower surface and rearward end of the trailer frame. A first side trailer hitch and a second side trailer hitch are also provided, each side trailer hitch having a forward end adapted to be coupled with a lead vehicle and a rearward end adapted to be received within one of the hollow side channels, each side trailer hitch further including a plurality of apertures formed along its length, the apertures being adapted for registration with the aperture of one of the hollow side channels, a pin positioned within each aperture of the hollow side channels, the pins being employed to secure each side trailer hitch at a selected position within its receptive side channel. A center trailer hitch has a forward end adapted to be coupled with a lead vehicle and a rearward end adapted to be received within the hollow center channel, the center trailer hitch including a plurality of apertures formed along its length, the apertures of the center channel being adapted for registration with an aperture of the hollow center channel, a pin positioned within the aperture of the hollow center channel, the pin being employed to secure the center trailer hitch at a selected position within the hollow center channel. A wheel rotation lock assembly includes a T-shaped locking element, the locking element having a base portion positioned within the rearward end of the hollow center channel, the locking element further including two pin elements adapted for simultaneous positioning within, and removal from, the apertures formed within the depending skirts of the wheel assemblies, the lock assembly further includes a spring positioned about the base portion, the spring being adapted to bias the pin elements into the apertures of the depending skirts and thus prevent the rotation of the lower plate relative to the upper plate.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved convertible trailer assembly which has all the advantages of the prior art trailers and none of the disadvantages.

It is another object of the present invention to provide a new and improved convertible trailer assembly which may be easily and efficiently manufactured and marketed.

It is a further object of the present invention to provide a new and improved convertible trailer assembly which is of a durable and reliable construction.

An even further object of the present invention is to provide a new and improved convertible trailer assembly which is susceptible of a low cost of manufacture with regard to both materials and labor, and which accordingly is then susceptible of low prices of sale to the consuming public, thereby making such assemblies economically available to the buying public.

Still yet another object of the present invention is to provide a new and improved convertible trailer assembly which provides in the apparatuses and methods of the prior art some of the advantages thereof, while simultaneously overcoming some of the disadvantages normally associated therewith.

Still another object of the present invention is to provide a new and improved convertible trailer assembly which permits an operator to select from one of two hitching orientations.

Yet another object of the present invention is to provide a new and improved convertible trailer assembly which includes a set of wheel assemblies and two sets of coil overshock devices.

Even still another object of the present invention is to provide a new and improved convertible trailer assembly which enables the wheel assemblies to be either in a locked or unlocked orientation depending upon the hitching orientation.

Lastly, it is an object of the present invention to provide a convertible a convertible trailer assembly having a first orientation wherein a center trailer hitch is connected to a lead vehicle and a second orientation wherein two outside trailer hitches are connected to a lead vehicle, the convertible trailer assembly comprising a trailer frame having an upper surface, a lower surface, a forward end and a rearward end, two longitudinally extending hollow side channels, each hollow side channel having a forward end and a rearward end, a longitudinally extending hollow center channel, the hollow center channel having a forward end and a rearward end. Wheel assembly means include a fixed upper plate and a rotatably connected lower plate, the upper and lower plates each having a forward end and a rearward end, the lower plate including a depending skirt integral with one end, the depending skirt including a centrally located aperture, coil overshock means having an upper end coupled with one end of the lower plate and a lower end opposite the upper end, a vertical arm extending downwardly from the forward end of the lower plate, horizontally extending arm means connecting the lower ends of the coil overshock means with the vertical arm, a wheel rotatably mounted between the lower ends of the coil overshock means and the horizontally extending arm means with the upper of the wheel assembly being coupled to lower surface and rearward end of the trailer frame. A first side trailer hitch and a second side trailer hitch are provided, each side trailer hitch having a forward end adapted to be coupled with a lead vehicle, and a rearward end adapted to be received within one of the hollow side channels. Lastly, a center trailer hitch having a forward end adapted to be coupled with a lead vehicle, and a rearward end adapted to be received within the hollow center channel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
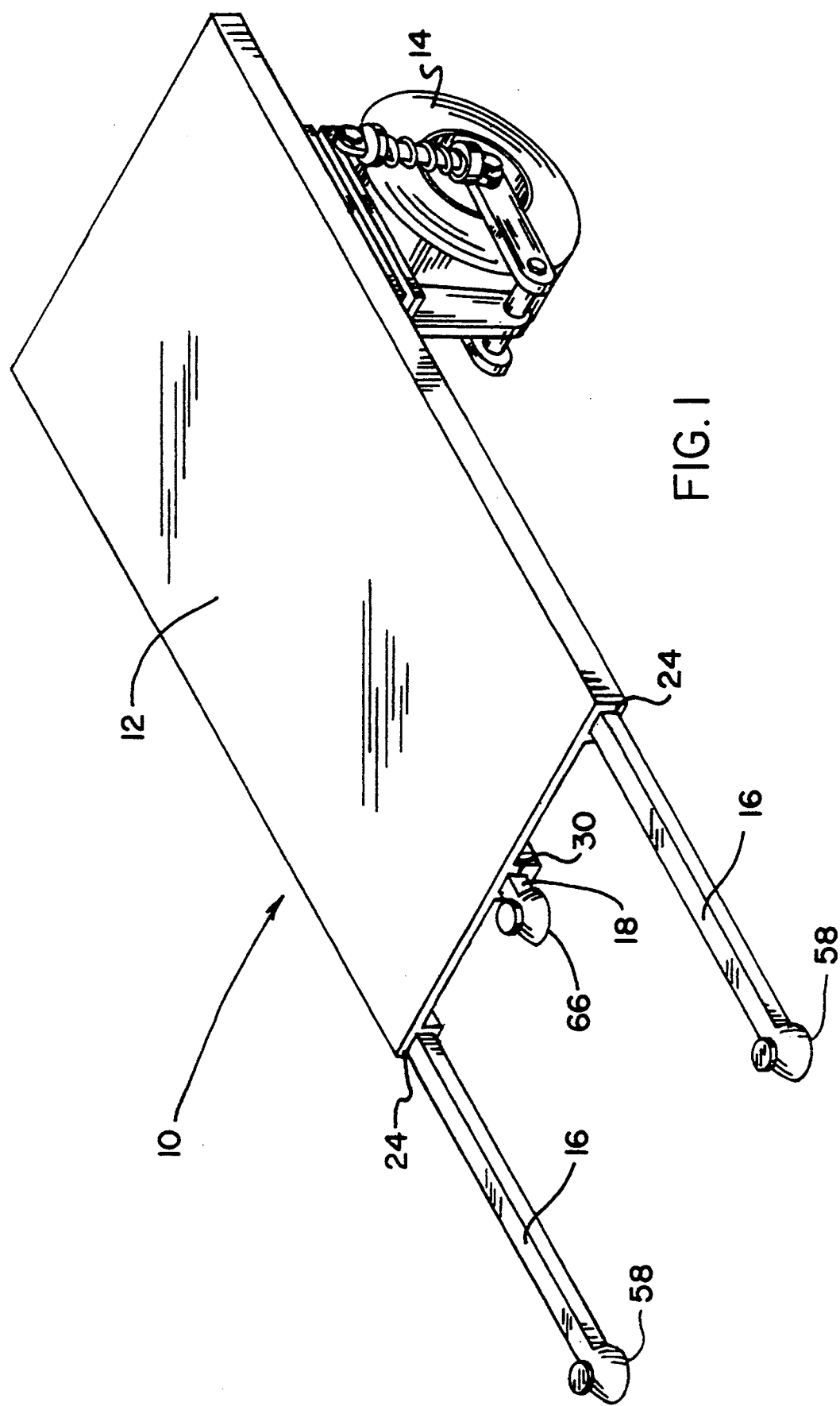
FIG. 1 is a perspective view illustrating the trailer assembly in accordance with the present invention.
Figure 3:
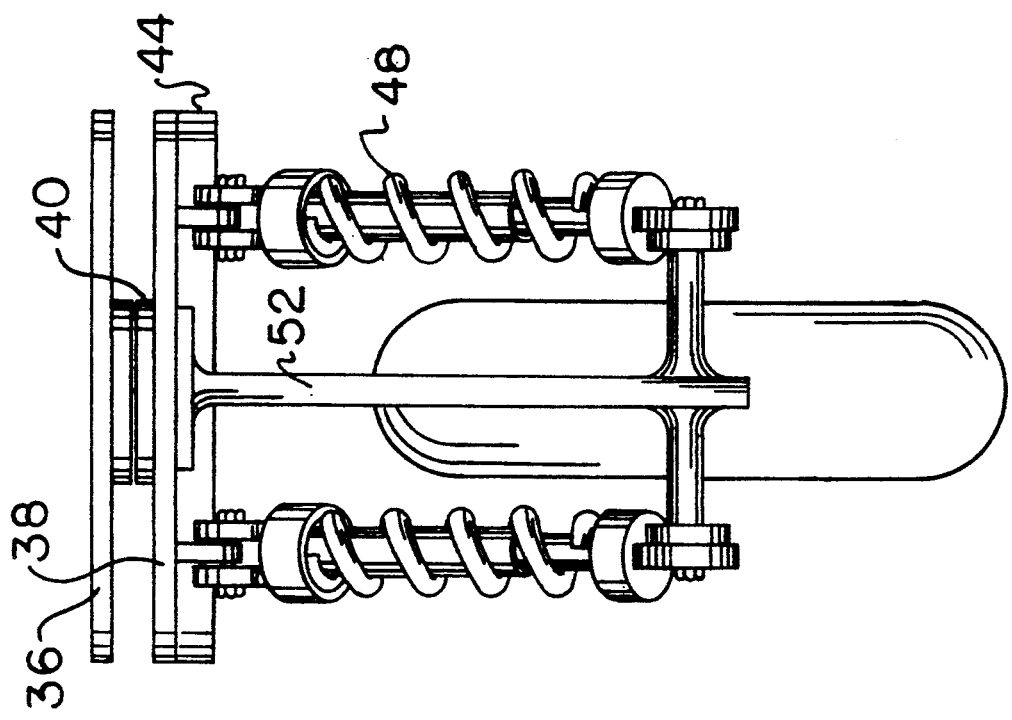
FIG. 3 is a front elevational view illustrating the wheel assembly of the present invention.
Figure 2:
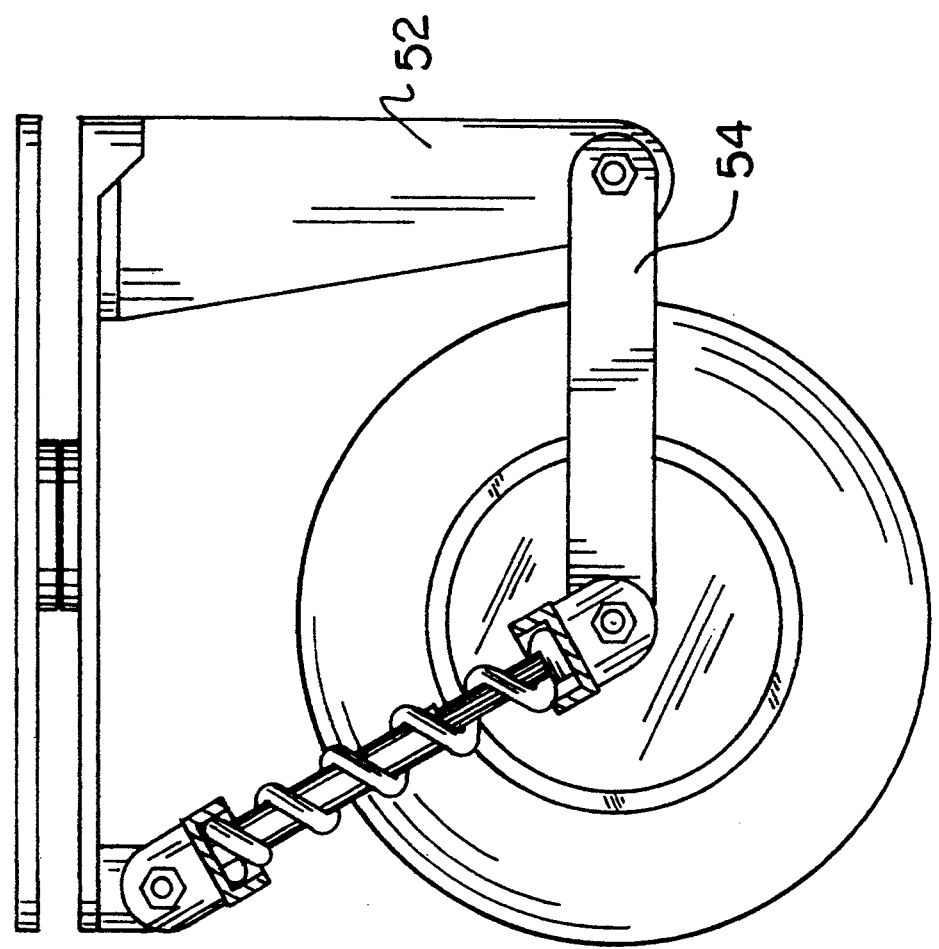
FIG. 2 is a side elevational view illustrating the wheel assembly of the present invention.
Figure 4:
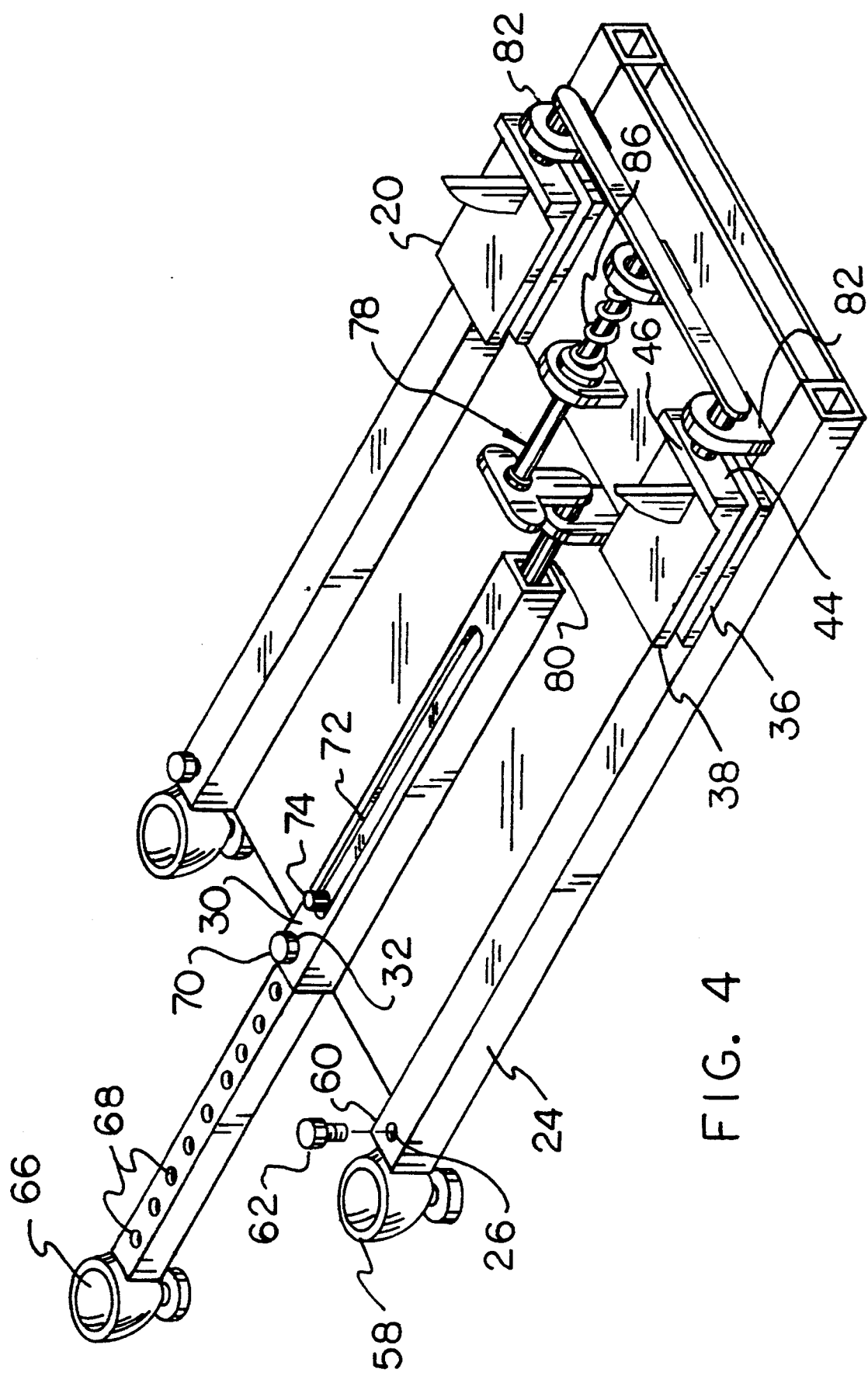
FIG. 4 is a view of the lower surface of the trailer in accordance with the present invention.

With reference now to the drawings, and in particular to FIG. 1 thereof, a new and improved convertible trailer assembly embodying the principles and concepts of the present invention and generally designated by the reference numeral 10 will be described.

The present invention relates to a convertible trailer assembly. The trailer assembly of the present invention is designed to haul recreational vehicles behind a camper or the like. However, the present invention can be applied to a wide variety of trailers. The trailer assembly has a first orientation where the trailer is extended and a first mode wherein a center trailer hitch is connected to a lead vehicle and the rear wheel assemblies of the trailer are prevented from rotation. The trailer assembly also has a second orientation wherein the trailer is extended and a second mode wherein two outside trailer hitches are connected to a lead vehicle and the rear wheel assemblies are free to rotate. In the broadest of context, the present trailer assembly 10 includes a trailer frame 12, two wheel assemblies 14, a first and second side trailer hitches 16, a center trailer hitch 18 and a wheel rotation locking assembly 20.

The trailer frame 12 has an upper surface, a lower surface, a forward end and a rearward end. The frame can be constructed from a variety of materials, however, aluminum is envisioned in the preferred embodiment. The frame includes two longitudinally extending hollow side channels 24, with each of the hollow side channels having a forward end and a rearward end. Additionally, an aperture 26 is formed through each of the hollow side channels at their forward ends. The trailer frame also includes a longitudinally extending hollow center channel 30. The hollow center channel has a forward end and a rearward end. As with the side channels, the center channel includes an aperture 32 formed through its forward end.

The wheel assembly 14 of the trailer 12 form an important aspect of the present invention. Each of the wheel assemblies 14 includes an upper plate 36 and a rotatably connected lower plate 38. The upper and lower plates each have a forward end and a rearward end. The rotatable connection between the upper and lower plate can be achieved in any conventional manner. One way in which the rotatable connection can be achieved is through ball bearings 40.

Each lower plate includes a depending skirt 44 integral with its rearward end. Positioned within the depending skirt is a centrally located aperture 46. Each of the wheel assemblies includes two coil overshocks 48. The coil overshocks are simply a pneumatic shock absorbers positioned within a spring. Each of the coil overshocks has an upper end coupled with the rearward end of the lower plate and a lower end opposite the upper end. In addition to the two coil overshocks each wheel assembly includes a vertical arm 52 which extends downwardly from the forward end of the lower plate. Furthermore, two horizontally extending arms 54 serve to connect the lower ends of the coil overshocks with the vertical arm. The wheel of the wheel assemblies is rotatably mounted in between the lower ends of the two coil overshocks and the two horizontally extending arms.

The upper plates 36 of the wheel assemblies 14 are designed to be coupled to the lower surface and rearward end of the trailer frame 12. Thus, each wheel assembly as described provides a wheel with an interconnected shock absorbing means and a rotational coupling to the underside of the trailer frame.

The trailer assembly 10 can be coupled to a lead vehicle by way of two side trailer hitches 16. Alternatively, coupling may be by a central trailer hitch 18. In the first arrangement, a first and second side trailer hitch 16 are employed. Each side trailer hitch has a forward end 58 adapted to be coupled with a lead vehicle, and a rearward end adapted to be received within one of the hollow side channels 24. Each side trailer hitch includes a plurality of apertures 60 formed along its length. The apertures are adapted for registration with the aperture 26 of one of the hollow side channels. A pin 62 is positioned within each aperture of the hollow side channels. These pins serve to secure each side trailer hitch at a selected position within its respective side channel.

The center trailer hitch 18 has a forward end 66 adapted to be coupled with a lead vehicle and a rearward end adapted to be received within the hollow center channel 30. As with the side trailer hitches, the center trailer hitch includes a plurality of apertures 68 formed along its length. The apertures 68 of the center channel are adapted for registration with the aperture 32 of the hollow center channel. A pin 70 is positioned within the aperture of the hollow center channel. The pin is employed to secure the center trailer hitch at a selected position within the hollow center channel. Furthermore, the hollow center channel includes a longitudinally extending slot 72. The slot is designed to receive a pin 74 protruding up from the central trailer hitch. The pin in slot arrangement of the center hitch/channel enables a user to extend and retract the trailer hitch from the underside of the trailer frame.

In order to lock the wheel assemblies such that there is no rotational movement between the upper and lower plates, as is desired when the central hitch is in use, a wheel rotation lock assembly 20 is provided. The assembly includes a T-shaped locking element 78. The locking element has a base portion 80 positioned within the rearward end of the hollow center channel 30. The base portion extends from the rearward end of the center channel to the rearward end of the trailer frame. The locking element further includes two pin elements 82. The pin elements are positioned at the end of the t-shaped locking element opposite the base portion. The two pin elements are adapted for simultaneous positioning within or removal from, the apertures 46, formed within the depending skirts 44 of the wheel assemblies. The lock assembly further includes a spring 86 positioned about the base portion. The spring is adapted to bias the pin elements into the apertures of the depending skirts and thus prevent the relative rotation between the upper and lower plates.

Thus, in use an operator can select one of two configurations for the trailer assembly. In the first configuration, the central hitch is employed to connect the trailer to a towing vehicle. The connection between the central hitch and the vehicle is of a conventional nature. A typical ball and socket arrangement is envisioned in the present invention. When the central hitch is extended the spring of the locking assembly biases the pin elements into the apertures formed in the skirts of the lower plates. These pin elements lock the lower plates against rotation relative to the upper plates. Thus, with the central hitch in use the wheels of the trailer are in a first mode with no swiveling capability. In the second arrangement the central hitch is positioned with the central hollow channel, and the two side hitches are extended. With this arrangement, the spring biasing of the locking assembly is overcome and the pin elements are removed from the apertures formed within the depending skirts of the lower plates. Thus, in the second arrangement the two side hitches are used to the lead vehicle, and the wheels are in a second mode and are provided with swivel capability.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved convertible trailer assembly having a first orientation wherein a center trailer hitch is connected to a lead vehicle and wherein rear wheel assemblies of the trailer are prevented from pivotal rotation, and a second orientation wherein two outside trailer hitches are connected to a lead vehicle and the rear wheel assemblies are free to rotate, the convertible trailer assembly comprising, in combination:

a trailer frame having an upper surface, a lower surface, a forward and rearward end, two longitudinally extending hollow side channels, each hollow side channel having a forward end and a rearward end with an aperture formed through each hollow side channel at the forward end, a longitudinally extending hollow center channel, the hollow center channel having a forward end and a rearward end and an aperture formed through the forward end;

two wheel assemblies, each wheel assembly including a fixed upper plate and a rotatably connected lower plate, the upper and lower plates each having a forward end and a rearward end, the lower plate including a depending skirt integral with the rearward end thereof, the depending skirt including a centrally located aperture, two coil overshocks each having an upper end coupled with the rearward end of the lower plate and a lower end opposite the upper end, a vertical arm extending downwardly from the forward end of the lower plate, two horizontally extending arms, the two horizontally extending arms connecting the lower ends of the coil overshocks with the vertical arm, a wheel rotatably mounted between the lower ends of the two coil overshocks and the two horizontally extending arms, the upper plates of the wheel assemblies being coupled to the lower surface and rearward end of the trailer frame;

a first side trailer hitch and a second side trailer hitch, each side trailer hitch having a forward end adapted to be coupled with a lead vehicle and a rearward end adapted to be received within one of the hollow side channels, each side trailer hitch further including a plurality of apertures formed along the length thereof, the apertures being adapted for registration with the aperture of a respective hollow side channel, a pin positioned within each aperture of the hollow side channels, the pins being employed to secure each side trailer hitch at a selected position within a respective side channel;

a center trailer hitch having a forward end adapted to be coupled with a lead vehicle and a rearward end adapted to be received within the hollow center channel, the center trailer hitch including a plurality of apertures formed along the length thereof, the apertures of the center channel being adapted for registration with an aperture of the hollow center channel, a pin positioned within the aperture of the hollow center channel, the pin being employed to secure the center trailer hitch at a selected position within the hollow center channel; and a wheel rotation lock assembly including a T-shaped locking element, the locking element having a base portion positioned within the rearward end of the hollow center channel, the locking element further including two pin elements adapted for simultaneous positioning within, and removal from, the apertures formed within the depending skirts of the wheel assemblies, the lock assembly further includes a spring positioned about the base portion, the spring being adapted to bias the pin elements into the apertures of the depending skirts and thus prevent the rotation of the lower plate relative to the upper plate.

2. A convertible trailer assembly having a first orientation wherein a center trailer hitch is connected to a lead vehicle and a second orientation wherein two outside trailer hitches are connected to a lead vehicle, the convertible trailer assembly comprising:

a trailer frame having an upper surface, a lower surface, a forward end and a rearward end, two longitudinally extending hollow side channels, each hollow side channel having a forward end and a rearward end, a longitudinally extending hollow center channel, the hollow center channel having a forward end and a rearward end;

wheel assembly means including a fixed upper plate and a rotatably connected lower plate, the upper and lower plates each having a forward end and a rearward end, the lower plate including a depending skirt integral with one end, the depending skirt including a centrally located aperture, coil overshock means having an upper end coupled with one end of the lower plate and a lower end opposite the upper end, a vertical arm extending downwardly from the forward end of the lower plate, horizontally extending arm means connecting the lower ends of the coil overshock means with the vertical arm, a wheel rotatably mounted between the lower ends of the coil overshock means and the horizontally extending arm means with the upper plate of the wheel assembly being coupled to the lower surface and rearward end of the trailer frame;

a first side trailer hitch and a second side trailer hitch, each side trailer hitch having a forward end adapted to be coupled with a lead vehicle, and a rearward end adapted to be received within one of the hollow side channels;

a center trailer hitch having a forward end adapted to be coupled with a lead vehicle, and a rearward end adapted to be received within the hollow center channel; and means for preventing the rotation of the lower plate of the wheel assembly from rotation relative to the upper plate when the central hitch is extended.

3. A convertible trailer assembly having a first orientation wherein a center trailer hitch is connected to a lead vehicle and a second orientation wherein two outside trailer hitches are connected to a lead vehicle, the convertible trailer assembly comprising:

a trailer frame having an upper surface, a lower surface, a forward end and a rearward end, two longitudinally extending hollow side channels, each hollow side channel having a forward end and a rearward end, a longitudinally extending hollow center channel, the hollow center channel having a forward end and a rearward end;

wheel assembly means including a fixed upper plate and a rotatably connected lower plate, the upper and lower plates each having a forward end and a rearward end, the lower plate including a depending skirt integral with one end, the depending skirt including a centrally located aperture, coil overshock means having an upper end coupled with one end of the lower plate and a lower end opposite the upper end, a vertical arm extending downwardly from the forward end of the lower plate, horizontally extending arm means connecting the lower ends of the coil overshock means with the vertical arm, a wheel rotatably mounted between the lower ends of the coil overshock means and the horizontally extending arm means with the upper plate of the wheel assembly being coupled to the lower surface and rearward end of the trailer frame;

a first side trailer hitch and a second side trailer hitch, each side trailer hitch having a forward end adapted to be coupled with a lead vehicle, and a rearward end adapted to be received within one of the hollow side channels;

a center trailer hitch having a forward end adapted to be coupled with a lead vehicle, and a rearward end adapted to be received within the hollow center channel; and means for permitting the rotation of the lower plate of the wheel assembly from rotation relative to the upper plate when the two side hitches are extended.

* * * * *